Figure 1:
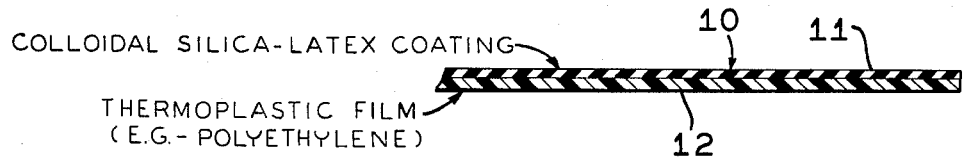

Dec. 21, 1965  H. TEICHER  3,224,901
SLIP-RESISTANT THERMOPLASTIC RESIN SHEETS
AND PROCESS FOR PRODUCING SAME
Filed Oct. 19, 1961

INVENTOR
HARRY TEICHER
BY *Richard W. Sternberg*
ATTORNEY

United States Patent Office 3,224,901
Patented Dec. 21, 1965

3,224,901
SLIP-RESISTANT THERMOPLASTIC RESIN SHEETS
AND PROCESS FOR PRODUCING SAME
Harry Teicher, Olivette, Mo., assignor to Monsanto
Company, a corporation of Delaware
Filed Oct. 19, 1961, Ser. No. 145,183
13 Claims. (Cl. 117—138.8)

The present invention relates to treated or coated sheets or films fabricated from thermoplastic resins or polymers, and particularly to treated or coated sheets or films which have a slip-resistant surface. This invention also relates to methods of treating the surfaces of normally slippery thermoplastic resin or polymer sheets or films to render such surfaces slip-resistant. The present invention more particularly relates to treated or coated polyolefin sheets or films which are characterized by a slip-resistant surface, and to methods for making polyolefin sheets or films slip-resistant. The present invention also relates to improved packaging containers fabricated from thermoplastic resin sheets or films which containers are characterized in having a slip-resistant surface.

Thermoplastic resins or polymers, particularly those which are water-insoluble, such as polyvinyl acetate, polyvinyl chloride, polystyrene, polyethylene, polypropylene and mixtures thereof, among others, have been fabricated into a wide variety of articles such as molded containers, clocks, pipes, fibres, filaments and rigid and non-rigid or flexible films or sheets, and have also been applied to cellulose paper or paperboard as a film or coating on these articles to provide a water-resistant or water-vapor resistant barrier. Thermoplastic resin or polymer films and sheets have been in increasing quantities for such uses as covering materials, such as tarpaulins, as well as in the packaging industry where such sheets and films have certain distinct and well-known advantages (e.g. improved resistance to moisture vapor transmission) over conventional cellulosic packaging materials such as, for example, paper or cellophane. However, sheets or films fabricated from such thermoplastic resins possess the inherent disadvantage of having an extremely slippery surface which restricts their use in a number of applications. Thus, for example, when used as a tarpaulin to cover machinery such films slip or are easily dislodged from the machinery and although otherwise suitable for use as drop cloths for painters, the slippery surface of such materials constitutes a safety hazard. Also, when the films are fabricated into containers such as bags, the containers slip and slide against each other when being transported by hand, truck, motor vehicles, rail carriers, water carriers and the like, are difficult to store in stacks and often slide while in storage. This phenomenon results in shifting of loads, spillage, loss of containers from moving vehicles and accidents to handling and warehouse personnel.

Attempts which have been made heretofore to overcome the difficulty of the slippery surface of thermoplastic resin or polymer films, without otherwise adversely altering one or more such properties as flexibility, transparency, tensile strength, tear strength, printing characteristics and the like, have been largely unsuccessful.

Novel, treated or coated thermoplastic resin sheets or films having a slip-resistant surface, the methods for treating the surfaces of normally slippery thermoplastic resin or polymer sheets or films and improved packaging containers fabricated from thermoplastic resin sheets and films and characterized in having a slip-resistant surface were disclosed in my application for Letters Patent Serial No. 65,188, filed in the United States Patent Office, October 26, 1960, and assigned to the same assignee as the present application. The disclosure contained in the present application should be taken in conjunction with said application for Letters Patent Serial No. 65,188 and considered as a continuation-in-part of said application Serial No. 65,188 which is now abandoned.

It is one object of the present invention to provide thermoplastic polymer films and sheets which are characterized in having a slip-resistant surface.

It is another object of the present invention to provide a process for treating thermoplastic polymer films and sheets to render them slip-resistant.

It is still a further object of the present invention to provide improved slip-resistant packaging containers fabricated from thermoplastic resins or polymers.

Other objects and advantages of the present invention will become apparent from the following description and the appended claims.

Figure 2:
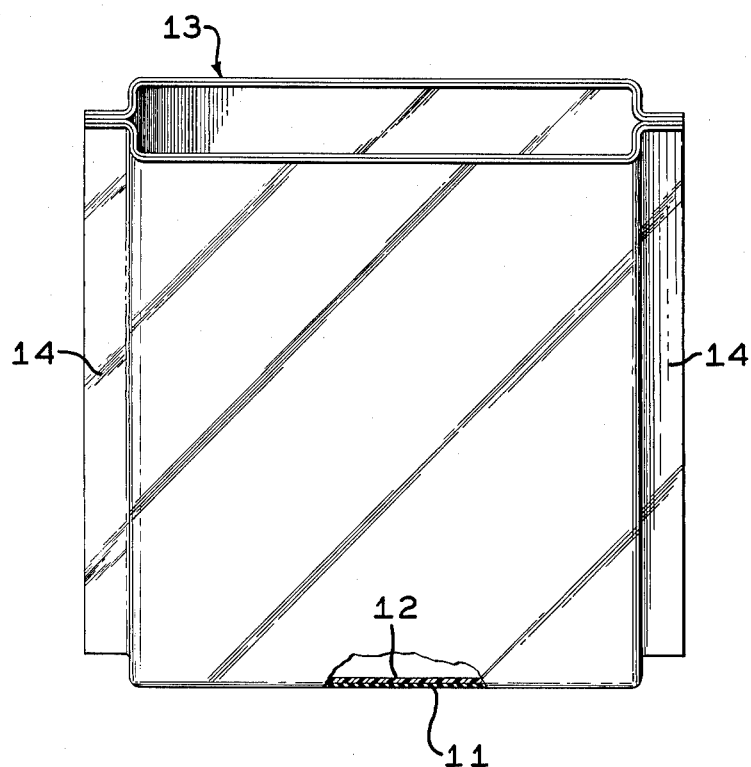

In the accompanying drawings, forming a part of this specification, and in which like numerals are employed to designate like parts throughout the same, FIGURE 1 is a vertical section through a slip-resistant, coated or treated thermoplastic film embodying the present invention, and FIGURE 2 is a side elevation, partially in section, of a transparent, slip-resistant, coated or treated packaging container fabricated of thermoplastic film and embodying the present invention.

The present invention is based on the unexpected discovery that the slippery surface of rigid, semi-rigid or flexible thermoplastic resin films or sheets, or cellulosic sheets having an outer coating or film of such thermoplastic resin or polymer, thereon, can be rendered slip-resistant when coated with a material comprising an aqueous medium, having dispersed therein an alkali-stabilized colloidal silica and fine or collodial particles of an inter-polymer or copolymer (preferably derived from an aqueous latex containing such inter-polymer particles) comprising the inter-polymerization product of a monovinylidene aromatic hydrocarbon, an alkyl ester of acrylic or methacrylic acid, and an ethylenically unsaturated organic carboxylic compound having at least one carboxyl group, for example, a copolymer latex containing a copolymer of from about 26% to about 65% by weight of styrene, from about 60% to about 34.5% by weight of an alkyl acrylate and from 14 to 0.5% by weight of an ethylenically unsaturated organic carboxylic compound containing from 3 to 9 carbon atoms, having at least 1 carboxyl group and copolymerizable therewith. The quantity of colloidal silica in such compositions is usually in the range of about 8% to 30% of the composition and is also in the range of about 10 to 500 parts by weight per 100 parts by weight of said copolymer in the composition. Suitable interpolymers are comprised of from about 25% to 65% by weight of a monovinylidene aromatic hydrocarbon from about 60% to 34.5% by weight of an alkyl acrylate or alkyl methacrylate and from about 15% to 0.5% by weight of an ethylenically unsaturated carboxylic compound having at least one carboxyl group and copolymerizable with the monovinylidene aromatic hydrocarbon and alkyl acrylate or methacrylate.

Such interpolymer or copolymer may also include, chemically combined or copolymerized therein in addition of the monomeric compounds described above, an unsaturated nitrile preferably a vinyl nitrile or vinylidene nitrile.

When the interpolymer or copolymer contains an unsaturated nitrile, such nitrile will generally replace a portion of the monovinylidene aromatic hydrocarbon and/or a portion of the alkyl ester or acrylic or methacrylic acid and/or a portion of the ethylenically unsaturated carboxylic compound, but preferably replaces a portion of such alkyl ester and a portion of such carboxylic compound.

Examples of such copolymers which have been found particularly suitable are copolymers of from about 25% to 60% by weight of monovinylidene aromatic hydrocarbon, preferably styrene, from about 60% to 35% by weight of an alkyl ester of acrylic or methacrylic acid, from 5% to 20% by weight of a copolymerizable ethylenically unsaturated carboxylic compound, having at least one carboxyl group and copolymerizable with the styrene and the alkyl ester of acrylic or methacrylic acid and from about 10% to about 3% by weight of an unsaturated nitrile, preferably a vinyl or vinylidene nitrile.

In FIGURE 1 of the accompanying drawings, wherein for the purpose of illustration is shown one preferred embodiment of this invention, the numeral 10 designates an article of manufacture comprising a sheet 12 of thermoplastic resin or polymer (preferably polyethylene) having a thin continuous coating 11 which is transparent and adherent to the thermoplastic sheet and is composed, for example, of a uniform mixture of colloidal particles of the aforementioned alkali-stabilized colloidal silica and inter-polymer, for example, an inter-polymer of styrene, alkyl acrylate and unsaturated carboxylic compound, preferably derived from the aforementioned latices. The coating 11 may be continuous or discontinuous but, in any event, provides slip-resistance to the coated surface of article 10.

The liquid coating composition which form the coatings 11 prepared in accordance with this invention are essentially composed of a continuous water phase and a dispersed phase comprising such colloidal silica and colloidal particles of the aforementioned copolymers. The water phase may have dissolved therein a dispersing or emulsifying agent and the catalysts used in the preparation of the copolymers. When these materials are formed into a liquid film or coating on a thermoplastic resin film or sheet it is possible to dry such liquid film to provide a clear continuous or discontinuous transparent solid coating which will provide a slip-resistant surface to the thermoplastic resin film.

The alkali-stabilized colloidal silica aquasols, which may be employed in the liquid coating compositions used in this invention, may be prepared in a variety of well-known ways. Thus such aquasols may be prepared from aqueous sodium silicate solutions by treatment with cation-exchange resins operating on the hydrogen cycle thereby reducing the $Na_2O$ to $SiO_2$ ratio of the original sodium silicate solution and providing a sol having an $SiO_2$ to $Na_2O$ ratio in the range of about 10:1 to 500:1. Such procedures are described in general and in greater detail in U.S. Patent No. 2,244,325 to Paul C. Bird granted June 3, 1941; U.S. Patent No. 2,457,791 to Vandeveer Voorhees granted January 4, 1949; U.S. Patent No. 2,573,743, to Henry S. Trail granted November 6, 1951; U.S. Patent No. 2,574,902, to Max F. Bechtold and Omar E. Snyder granted November 13, 1951; and U.S. Patent No. 2,577,485 to Joseph M. Rule granted December 4, 1951. Further, such silica sols may be prepared by dispersing silica hydrogels at elevated temperatures in the presence of an aqueous solution of small amounts of sodium hydroxide or an alkaline heat stable aquasol, as described, for example, in U.S. Patent No. 2,375,738 to John F. White granted May 8, 1945, and U.S. Patent No. 2,572,578 to Henry S. Trail granted October 23, 1951, respectively. Moreover, the alkali-stabilized colloidal silica sols may be prepared by removing the organic diluent from an alkaline organo-aquasol as described in U.S. Patent No. 2,515,949 to Vincent Di Maio granted July 18, 1950 or U.S. Patent No. 2,515,961 to Morris D. Marshall granted July 18, 1950, or by alkalizing an acidic organo-aquasol and removing the organic diluent therefrom as described in the aforesaid Di Maio and Marshall patents or as described in U.S. Patent No. 2,515,960 to Morris D. Marshall granted July 18, 1950.

All of the silica aquasols, prepared by the procedures referred to in the preceding paragraph, may be used in the liquid coating compositions herein described. All of these sols are slightly alkaline, having a pH in the range of 8.5 to 11.0, and have an $SiO_2$ to $M_2O$ mol ratio, where M is an alkali metal, in the range of about 10:1 to 500:1, and usually in the range of about 75:1 to about 200:1, more desirably a range of about 80:1 to about 300:1. These silica sols are also stable, in that they remain fluid, that is, do not gel for periods of about six months or longer at 20° C. at silica concentrations of about 20% by weight. However, depending upon the particular procedure used, stable silica aquasols containing up to 45% by weight of silica can be prepared.

Silica aquasols containing from 5% to 45% by weight, preferably 15% to 40% by weight of colloidal silica, may be generally used in the compositions of the present invention and such sols have an average ultimate particle size of less than about 250 millimicrons and generally in the range of about 5 to 200 millimicrons. The preferred sols have average colloidal silica particles of a size in the range of about 5 to 30 millimicrons, more particularly a range of about 10 to 25 millimicrons. When it is desired to obtain transparent films from the compositions of this invention, it has been generally found desirable to employ silica sols in which the average particle size is below 100 millimicrons preferably 5–80 millimicrons, since silica sols containing larger average size particles tend to produce hazy or opaque films. Film transparency or opacity is also dependent on film thickness, that is thinner films are more transparent, all things being equal, than thicker films. All of these sols contain essentially no, or only relatively small amounts, of water-soluble inorganic salts, usually sodium sulfate or sodium chloride, or both, which originate from the raw materials, for example, sodium silicate or sulfuric acid, employed in their manufacture. Usually such sols will contain less than 1.5% for example, in the range of 0.2 to 1.5% by weight of such inorganic salts and, in most instances, the sols prepared from sodium silicate and cation-exchange resins (for example, the process of the above Bird patent) or by dispersing silica hydrogel (for example, the process of the above White patent) will contain less than 1%, for example, in the range of 0.1 to 1% by weight of such inorganic salts.

The copolymers or inter-polymers employed in the liquid coating compositions used in this invention are preferably derived from aqueous latices which comprise extremely fine or colloidal particles of the low molecular weight copolymers, hereinbefore defined, which dispersed copolymer particles may vary somewhat as to particle size but desirably have a particle size in the range of about 50 to 8,000 Angstroms. When the copolymers do not include an unsaturated nitrile, the dispersed copolymers preferably have a particle size in the range of from 100 to 400 Angstroms, and more preferably a range of from 150 to 200 Angstroms. When the copolymers include an unsaturated nitrile, the dispersed copolymers preferably have a particle size in the range of from 1,000 to 5,000 Angstroms. The optimum latices insofar as all around results are concerned, usually contain an anionic dispersing agent and are characterized in having a surface tension in the range of 40–60 dynes per centimeter, and a viscosity (Brookfield) of 600–800 centipoises at 25° C. and a specific gravity between 1.01 to 1.3.

The copolymers or interpolymers may be prepared from styrene or a wide variety of other monovinylidene aromatic hydrocarbons, including monomers such as alpha methyl styrene, parachlorostyrene, 2,4-dichlorostyrene, 2, 5-dichlorostyrene, parabromostyrene, paramethylstyrene, alphamethylparamethylstyrene, meta-ethylstyrene, para-isopropylstyrene, vinyl naphthalene and the like. Mixtures of two or more such compounds may be employed if desired. However, the preferred monovinylidene hydrocarbon is styrene.

The acrylic or methacrylic alkyl esters used in preparing the copolymers employed in compositions of the present invention are alkyl acrylates or methacrylates wherein the alkyl group has from 1 to 20 carbon atoms. Of special utility, are alkyl acrylates or methacrylates wherein the alkyl group has from 4 to 20 carbon atoms. The copolymers or interpolymers which are preferably employed in the compositions of this invention may be prepared from a wide variety of acrylic and methacrylic alkyl esters including straight chain and branched chain aliphatic alcohols, and esters of these acids. Examples include those esters formed by esterifying acrylic or methacrylic acid with alcohols such as amyl alcohol, hexanol, 2-ethyl hexanol, octanol, 2-methyl pentanol the oxo alcohol of isobutylene dimer, heptyl alcohol, 3-methyl heptyl alcohol, tridecyl alcohol, tetradecyl alcohol and the like. Mixtures of two or more such acrylic or methacrylic acid esters may be employed if desired.

The preferred acrylic or methacrylic acid alkyl esters used in preparing the copolymers employed in the compositions of the present invention, when the copolymers do not contain an unsaturated nitrile, are alkyl acrylates, or methacrylates wherein the alkyl group has from 1 to 8 carbon atoms. Of special utility are alkyl acrylates wherein the alkyl group has from 4 to 8 carbon atoms and octyl acrylate is particularly preferred.

When the copolymer is one which contains combined therein an unsaturated nitrile, the acrylic or methacrylic acid alkyl esters employed preferably are alkyl acrylates or methacrylates wherein the alkyl group has from 5 to 20 carbon atoms and 2-ethylhexyl acrylate or methacrylate and decyl acrylate are particularly preferred.

A large variety of unsaturated organic compounds containing from 3 to 9 carbon atoms and having at least one carboxyl group may be copolymerized with styrene or one of the other monovinylidene hydrocarbons and the alkyl acrylates in forming the aforedescribed inter-polymers copolymers. As examples of such unsaturated organic carboxylic compounds may be mentioned the ethylenically-unsaturated aliphatic monocarboxylic acids such as alkenic monocarboxylic acids having from 3 to 6 carbon atoms as, for example, acrylic acid, butenic acids such as crotonic acid, isocrotonic acid, methyl acrylic acid and vinyl-acetic acid, and pentenic acids such as tiglic and angelic acids. In general, the ethylenically-unsaturated aliphatic monocarboxylic acids of the general formula $C_nH_{2n-2}O_2$, where $n$ is a whole number of from 3 to 6 and which are copolymerizable with styrene or the other monovinylidene aromatic hydrocarbons and alkyl acrylates are useful in preparing such copolymers.

As further examples of such unsaturated organic compounds containing from 3 to 9 carbon atoms and having at least one carboxyl group may be mentioned the ethylenically-unsaturated organic polybasic carboxylic acids such as maleic anhydride and maleic acid which are copolymerizable with styrene or the other monovinylidene aromatic hydrocarbons and alkyl acrylate monomer and also the relatively water-insoluble, ethylenically-unsaturated aliphatic dicarboxylic acids of which fumaric and itaconic acids are examples. Of these latter two fumaric acid is preferred because it is available commercially.

As further examples of unsaturated organic carboxylic compounds containing from 3 to 9 carbon atoms and having at least 1 carboxyl group may be mentioned the partial esters of ethylenically-unsaturated aliphatic di-carboxylic acids which are copolymerizable with styrene or the other monovinylidene aromatic hydrocarbons and alkyl acrylate monomers and preferably the alkyl half ester of such acids. As examples, of such partial esters may be mentioned the alkyl half esters of maleic acid in which the alkyl group contains from 1 to 4 carbon atoms, such as methyl, ethyl and propyl acid maleate; the alkyl half esters of fumaric acid in which the alkyl group contains from 1 to 4 carbon atoms such as methyl acid fumarate and secondary butyl acid fumarate; the alkyl half esters of citraconic acid, in which the alkyl group contains from 1 to 4 carbon atoms such as methyl and butyl citraconates; alkyl half esters of chloromaleic acid in which the alkyl group contains from 1 to 4 carbon atoms, such as ethyl and butyl acid chloromaleates; and alkyl half esters of itaconic acid in which the alkyl group contains from 1 to 4 carbon atoms, such as methyl and butyl acid itaconates and the like. These esters, with the exception of the alkyl and acid itaconates are represented generally by the structural formula

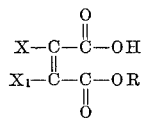

where X is hydrogen, halogen (preferably chlorine) or an alkyl group having at most a number of carbon atoms such that the total number of carbon atoms in the ester does not exceed 9, and where $X_1$ is the same as X or is preferably hydrogen when X is other than hydrogen, and where R is an alkyl group having 1 to 4 carbon atoms. It is to be understood that the foregoing structural formula for the esters is intended to include the cis- and trans-forms of the esters. Of the above esters, the alkyl half esters of maleic acid are preferred because they are readily prepared from commercially available alcohols and commercially available maleic anhydride. Of these half esters, the methyl half ester of maleic acid is preferred for preparing copolymers with styrene and alkyl acrylates for use in the compositions which form the slip-resistant coatings used in this invention.

It is to be understood that the copolymers described herein may comprise styrene, mixtures of alkyl acrylates, in which the alkyl groups have from 4 to 8 carbon atoms, and the unsaturated carboxylic compounds hereinbefore described, for example, copolymers of styrene, alkyl acrylates having less than 9 carbon atoms, crotonic acid and alkyl half esters of maleic acid in which the alkyl group contains between 1 and 4 carbon atoms, copolymers of styrene, alkyl acrylates, crotonic acid, acrylic acid and the like.

When the copolymers employed in the compositions of this invention include unsaturated nitriles it is preferred to use, as the ethylenically unsaturated carboxyl containing co-monomer, an unsaturated monocarboxylic acid including, for example, acrylic acid, methacrylic acid, cinnamic acid, crotonic acid, atropic acid and the like. The unsaturated nitriles which may be employed in the latices are vinyl or vinylidene nitriles and include acrylonitrile and methacrylonitrile. A mixture of unsaturated nitriles such as acrylonitrile with methacrylonitrile or a mixture of two or more of the unsaturated monocarboxylic acids may also be used if desired.

The preferred copolymers of this invention (when the unsaturated nitriles are not incorporated therein) from the standpoint of proportions of ingredients are copolymers of from 30% to 48% by weight of styrene or other monovinylidene aromatic hydrocarbons from 69.5 to 38% by weight of alkyl acrylate or methacrylate and from 0.5% to 14% by weight of the unsaturated organic carboxylic compounds hereinbefore described. When the above-described unsaturated nitriles are incorporated, the preferred proportions are from 40 to 60% by weight of styrene or another monovinylidene aromatic hydrocarbon from 45 to 35% by weight of alkyl acrylate or alkyl methacrylate, from 5% to 2% of ethylenically unsaturated organic monocarboxylic compound and from 10% to 3% by weight of unsaturated nitrile. The preferred copolymers (which do not contain an unsaturated nitrile) of this invention from the standpoint of molecular weight are copolymers which have a molecular weight such that an aqueous latex containing 40% by weight of copolymers in the form of discrete particles having a particle size in the range of 150–250 Angstroms, a specific gravity of 1.01 at 25° C. and a viscosity (Brookfield) of between 600 and 800 centipoises at 25° C. Where the copolymer includes an unsaturated nitrile the particle size of the copolymer particles preferably is in the range of from about 1,000 to 5,000 Angstroms, although the specific gravity and viscosity will be substantially the same as for the copolymers described in the preceding sentence.

The copolymer particles employed in the compositions used in this invention may be prepared by various processes well-known to those skilled in the art. In the examples hereindescribed such copolymer particles were prepared in the form of an aqueous latex according to the following procedure.

Three hundred seventy parts by weight of a mixture comprising 40% by weight of styrene, 58% by weight of octyl acrylate and 2% water are placed in a suitable reactor equipped with agitator and a nitrogen inlet. There is also added 350 parts by weight of 2.2% aqueous solution of sodium lauryl sulfate, 0.04 parts by weight of $FeSO_4 \cdot 9H_2O$ and 0.7 part by weight of 30% hydrogen peroxide.

Reaction is initiated by stirring at a temperature of about 40° C. and 50° C. after sweeping out all of the air from the apparatus and, once started, is allowed to proceed at a steady temperature of about 30° C. At the same time, there is added steadily, at the rate of about 6 to 8 parts by weight per hour for 18–22 hours, a monomer mixture of 17% octyl acrylate, 74% styrene, 8% of methyl half ester of maleic acid and 1% water together with additional emulsifying liquid consisting of 10% sodium lauryl sulfate solution, at about 5 parts by weight per hour, the total additions consisting of about 140 parts by weight of monomer and 100 parts by weight of emulsifier. About 15 hours after the start of the reaction the temperature is raised to 40° C. and, after all the monomer is added, the temperature is raised to about 60° C. and the reaction mixture heated for an additional period of about 2 hours, having added additionally 0.5 part by weight of hydrogen peroxide catalyst. If desirable there may be added an additional amount of aqueous dispersing agent such as a 12% sodium lauryl sulfate solution depending upon whether a more or less viscous dispersion is desired. The product, prepared as described, is an aqueous latex containing colloidal particles of an interpolymer of 48% styrene, 60% octyl acrylate and 2% of the methyl half ester of maleic acid.

A specific example of a latex especially suitable for use in the coating or film-forming compositions of the present invention is a styrene-acrylic latex composed of a copolymer of styrene, octyl acrylate and one of the copolymerizable, ethylenically unsaturated organic carboxylic acid compounds hereindescribed, specifically a methyl, ethyl, or butyl acid (or half) ester of maleic acid.

Where the interpolymer or copolymer latices include an unsaturated nitrile, such copolymers may be prepared by the processes described in U.S. Patent 2,767,153, granted October 16, 1956, to Ernest A. Sutton, assigned to Monsanto Chemical Company.

These latices may also generally be obtained by interpolymerizing the monomer components within a certain hereinbefore specified range of proportions. The unsaturated ester usually comprises about 35–60% by weight of the total monomer charge, the unsaturated nitrile generally comprises 3–10% by weight of the total monomer charge, the unsaturated monocarboxylic acid usually comprises about 2–5% by weight of the total monomer charge and the remainder of the monomer charge, i.e., 60–25% by weight is usually comprised of the monovinylidene hydrocarbon. Latices prepared by interpolymerizing the monomeric components in the above proportions will, when employed in certain compositions of this invention, provide compositions which will dry to form continuous films at a temperature of about 10° C. or less. In a preferred latex about 35–45% by weight of unsaturated ester, 3–10% by weight of unsaturated nitrile, 3–5% by weight of unsaturated monocarboxylic acid and 60–40% by weight of monovinylidene aromatic hydrocarbon may be interpolymerized to form latices which, when employed in the compositions of this invention will provide compositions which will dry to form continuous films at a temperature as low as 5.0° C. or less.

In the compositions which form the slip-resistant coatings of this invention, the quantity of colloidal silica as $SiO_2$ may vary to some extent but is desirably in the range of 8% to 30% by weight and preferably in the range of about 10% to 15% by weight. Additionally, the amount of colloidal silica as $SiO_2$ is desirably in excess of 10 parts by weight per 100 parts by weight of any of the aforedescribed copolymers present in the compositions employed to form the slip-resistant coatings of this invention, and preferably in the range of about 25 parts to 250 parts by weight of $SiO_2$ per 100 parts by weight of a particular copolymer. If the amount of $SiO_2$ is below 10 parts per 100 parts by weight of the copolymer, the films formed from such compositions will exhibit little if any soil resistant properties and will often be tacky. In general the upper limit of colloidal silica as $SiO_2$ will be about 500 parts by weight per 100 parts by weight of the copolymer. If such limit is exceeded the films formed will tend to be discontinuous and such films generally do not have good resistance to water penetration and do not act as moisture vapor barriers.

The compositions which are employed to form the slip-resistant coatings of this invention may be prepared in a variety of ways. For example, an aqueous latex of the copolymer can be added directly to the alkali-stabilized colloidal silica aquasol and dispersed therein. When the finely divided copolymer is added in the form of an aqueous latex however, it is preferred that such latex have at least 40% by weight of the copolymer dispersed therein in order to avoid excessive dilution of the aquasol.

The preferred compositions, for use to form the slip-resistant coatings of the present invention, are characterized in having a total dispersed solids content, comprised of the copolymer and colloidal silica in total amounts of from between 30% and 40% by weight, preferably 32% to 37% by weight, a viscosity (Brookfield) of between 6 and 14, preferably between 7.5 and 12.5, centipoises at 25° C., and the dried coatings produced from these compositions have a specific gravity of from 1.3 to 1.9, preferably from 1.5 to 1.7, at 25° C. The preferred coating compositions are further characterized in that the total solids content of the copolymer and colloidal silica comprises a copolymer to $SiO_2$ weight ratio of from 4:1 to 1:4, preferably from 3:1 and 1:3. The coating composition, which is particularly preferred from the standpoint of overall performance and versatility of the resulting coating, is a composition having a total solids content (comprised of the copolymer and colloidal silica) of 34.6% by weight, wherein the weight ratio of copolymer to $SiO_2$ is about 1:1, and has a viscosity of 9.0 centipoises at 25° C. The dried coatings produced from such compositions have a specific gravity of about 1.82.

The thermoplastic resin or polymer sheets which may be made slip-resistant in accordance with the present invention are fabricated by processes well-known in the art such as for example by molding or extrusion processes. The thermoplastic polymer sheets which are fabricated by molding processes are generally rigid or semi-rigid or flexible and usually have thicknesses of $\frac{1}{32}$ of an inch or greater, whereas thermoplastic polymer sheets which are fabricated by extrusion processes, are usually flexible and generally have thicknesses of from 0.5 mil to $\frac{1}{16}$ of an inch. Such sheets may be transparent or translucent, depending upon the character of the thermoplastic polymer, and the surface of such sheets is almost always extremely slippery and in any event is too slippery for many uses. Such thermoplastics polymers may also occur as sheets or films which have been sprayed on other sheeted material, for example paper, and the thickness of such thermoplastic sheet is then usually less than 1 mil.

The coating compositions used in this invention may be employed to impart slip-resistant properties to a wide variety of sheets or films fabricated from the herein-referred-to thermoplastic resins or polymers or to cellulosic sheets such as paper which have on their outer surface a coating or film of such thermoplastic resins or polymers. For example, the surfaces of molded or extruded sheets fabricated from polyvinyl acetate, polyvinyl chloride, polystyrene, polyethylene, polypropylene, and the like, may be made slip-resistant when a coating of one of the aforedescribed liquid coating compositions is applied to such sheets and the coating is dried, preferably by heating at a temperature in the range of from about 30° C. to just below the softening point of the thermoplastic or resin or polymer sheets. Also, flexible films which have been fabricated from the aforementioned thermoplastic resins or polymers, or dry thermoplastic resin or polymer films which are adhered to or on paper may be made slip-resistant when a coating of one of the aforedescribed liquid compositions of colloidal silica and copolymer is applied to such films, and the coating is thereafter dried.

Although all of the aforementioned thermoplastic polymer sheets or films may be rendered slip-resistant when coated in accordance with the processes of this invention, the wide commercial acceptance of polyolefin films or sheets particularly polyethylene films or sheets, in addition to certain physical and chemical properties of such films, render them especially suitable for treatment by the processes herein-described. Such polyethylene sheets, films and coatings are well-known in the art and are prepared by processes described on pages 411 to 417 of "High Polymers," volume XI by R. A. U. Raff and J. B. Allison published in 1956 by Interscience Publishers, 250 Fifth Avenue, New York City, N.Y. The physical and chemical properties and types of polyethylene films, sheets and coatings which may be made slip-resistant in accordance with the process of the present invention are described on pages 447 and 471 of the above cited publication.

The polyolefin films, sheets and coatings which can be made slip-resistant by the processes of this invention consist of high density resins or polymers, that is, for example, polyethylene resins or polymers composed of large or high molecular weight molecules; low density resins or polymers, that is, for example, polyethylene resins or polymers composed of smaller or lower molecular weight molecules, and mixtures of these products. Such polyethylenes are characterized in having a density in the range of 0.910 to 0.960 gram per cubic centimeter, a "Melt Index" determined as described in ASTM D1238–57T in the range of 0.2 to 8.0, a tensile strength determined as described in ASTM D412–51T of 1400 to 4400 pounds per square inch, an impact strength determined as described in ASTM D256–56 of from 0.7 to greater than 16.0 foot pounds and a hardness (Shore D) of from 44 to 70.

Such polyolefin films which may be made slip-resistant in accordance with the processes of the present invention usually have a thickness of from about 1.0 to about 20 mils depending on the way in which the film is prepared or on the contemplated end use of the film. Where, for example, the film has been prepared by spraying or rolling a solution of polyolefin, such a polyethylene, on a cellulosic sheet such as paper or cardboard, the film so produced usually has a thickness of less than 1.0 mil. When the polyethylene film has been prepared by extrusion for general packaging purposes for example, for fabrication into bags, such film usually has a thickness in the range of from about 0.5 to about 20 mils depending upon the weight of the material to be packaged. For medium and light packaging, film thicknesses of the order of about 1.5 to about 4 mils are ordinarily preferred.

The polyolefin films may be treated with the aforedescribed liquid coating compositions of colloidal silica and the copolymer in a variety of ways, for example, by spraying, brushing, or rolling. The resultant liquid coating may then be air dried or heat dried, but is preferably dried at a temperature in the range of from 50° C. to 75° C. The coatings, when dried, may be continuous or discontinuous but are generally continuous, adherent films and may be clear or opaque depending upon the size of the particles of $SiO_2$ and the thickness of the coating or film. Generally the films will be transparent where the silica particles have an average particle size below 100 millimicrons and will usually become opaque when the average size of the particles of $SiO_2$ is increased above 150 millimicrons and the dried coating has a thickness of above 0.5 mil. Clear transparent coatings will almost always be obtained where the silica particles have an average particle size below 30 millimicrons. The dried coatings usually have a thickness in the range of from 0.1 to 1.0 mil and preferably contain between 20% and 71.5% by weight of colloidal silica and between 80 and 28.5% by weight of the finely divided inter-polymer.

The polyolefin films or sheets, when coated as aforedescribed, are films and sheets which have excellent slip-resistance wherein the tensile strength, tear strength and impact strength is usually either substantially the same or is slightly increased over the tensile, tear, and impact strengths of the untreated films or sheets.

The slip-resistant thermoplastic resin films of this invention may be used to fabricate containers such as bags which can then be used for the packaging of food stuffs, chemicals and the like. Such slip-resistant containers will generally not slip and slide against each other during commerical conditions of transport and usually can be stacked for storage without danger of slippage and resultant injury to warehouse personnel.

In FIGURE 2 of the accompanying drawings, wherein for the purpose of illustration is shown still another preferred embodiment of this invention, the numeral 13 designates a transparent packaging container which has four walls composed of transparent, flexible, thermoplastic polymer (preferably polyethylene) film 12, sealed on two sides by closures or (seals) 14, and having a thin, continuous coating 11 which is transparent and adherent to film 12, and is composed, for example, of a uniform mixture of colloidal particles of the aforementioned alkali-stabilized colloidal silica and inter-polymer, for example, of styrene, alkyl acrylate and unsaturated carboxylic compound, preferably derived from the aqueous latex of inter-polymer. As in the case of article 10 illustrated in FIGURE 1, the coating 11 on the container 13 may be continuous or discontinuous but, in any event, provides slip-resistance for the container 13.

The packaging containers of this invention may be single wall or multi-walled packaging containers. In the case of single walled packaging containers such containers may be fabricated directly from the coated thermoplastic polymer sheets of this invention or such containers may be fabricated from uncoated thermoplastic polymer sheets to which the coating may be applied by brushing, spraying, or the like, after the packaging container has been fabricated.

In the case of multi-walled packaging containers, such containers can be fabricated using conventional methods and materials in which the outer layer is composed of a thermoplastic sheet which has been made slip-resistant in accordance with the processes of this invention. Also multi-walled plastic containers in which the outer layer or wall is composed of a cellulosic sheet material which has been coated with a thermoplastic polymer such as, for example, polyethylene or polypropylene, may be made slip-resistant by applying the slip-resistant coatings of this invention to the polymer surface of the sheet either prior to or after it has been fabricated as the outer layer of a packaging container.

A further understanding of the composition, products, and processes of this invention will be obtained from the following specific examples which are intended to illustrate the invention but not to limit the scope thereof, parts and percentages being by weight unless otherwise specified.

*Example I*

One hundred parts of an aqueous latex containing about 60% of water and 40% of a finely divided dispersed copolymer consisting of particles of the interpolymerization product of a mixture of 48% styrene, 50% octyl acrylate and 2% of the methyl half ester of maleic acid and having an average particle size between 150 and 250 Angstroms, were added with agitation at room temperature (about 25° C.) to 133 parts of an alkali-stabilized colloidal silica aquasol having an $SiO_2$ content of 30%, a pH of about 9.5, an $SiO_2:Na_2O$ weight ratio of about 150:1, an average particle size of about 15 millimicrons and a sodium sulfate content of about 0.11% by weight, thereby forming a coating composition having a total solids content (comprised of the aforedescribed interpolymerization product and $SiO_2$) of 34.6% by weight, a viscosity of 9.0 centipoises at 25° C., a specific gravity of 1.62 and wherein the inter-polymerization product and $SiO_2$ were present in a weight ratio of 1:1.

A 1.5 mil thick transparent sheet of polyethylene film was coated on one side with the above composition, employing a laboratory coating machine to provide a liquid film, which when dried consisted of a film having a thickness of about 0.5 mil of dried composition. The sheet was then heated to about 50° C. for about 5 minutes until it was dried, that is, free of liquid. The coated side of the resultant sheet was characterized in having a high-gloss and excellent, slip-resistant properties, the detailed slip-resistant measurements being shown in Example IV herein. The coating was not tacky and did not reduce the transparency, tensile strength or the impact strength of the polyethylene film. The unused portion of the composition was labelled "Composition A" and set aside for further evaluation as described in Example IV.

*Example II*

Two hundred twenty-five parts by weight of the inter-polymerization product latex described in Example I was added with agitation, at room temperature, to 100 parts by weight of the colloidal silica aquasol described in Example I thereby forming an aqueous coating composition having a total solids content (comprised of the inter-polymerization product and $SiO_2$) of 36.4%, a viscosity of 12.5 centipoises at 25° C., wherein the specific gravity of the dried film was 1.32 and wherein the interpolymerization product and $SiO_2$ were present in a weight ratio of about 3:1.

The above composition was applied to one side of a 3.5 mil thick, transparent sheet of polyethylene film from an applicator roll, as the sheet passed at a rate permitting an even application of a film of the composition on the surface of the polyethylene sheet, after which the paper was continually passed through a drying zone at 60° C. The liquid coating thickness was such that when the coating was dried it had a thickness of 0.6 mil. The dried, coated polyethylene film so obtained was transparent and non-tacky, and was also characterized in having excellent slip-resistance and a high-gloss finish.

The coated sheet was not tacky and had a slight increase in tensile and impact strength over the uncoated polyethylene sheet. The unused portion of the composition was labelled "Composition B" and was set aside for further testing with respect to slip-resistance as hereinafter described in Example IV.

*Example III*

One hundred parts by weight of the inter-polymerization product latex described in Example I was added with agitation, at room temperature, to 400 parts by weight of the colloidal silica aquasol described in Example I to provide a compoistion having a total solids content (comprised of the inter-polymerization product and $SiO_2$) of 32.5% by weight, a viscosity of 7.5 centipoises at 25° C., and wherein the specific gravity of the dried film was 1.85 and wherein the weight ratio of inter-polymerization product to silica was a weight ratio of 1:3.

The above described composition was applied to a sheet of polyethylene film of the same thickness as in Example I using the same method of application and drying as described in that example. The resulting sheet had a high gloss and was slip-resistant on the coated side. The sheet was also transparent and the liquid coating applied was such that when it was dried the resultant dry coating had a thickness of about 0.2 mil. The dried coating was not tacky and did not reduce the tensile strength or the impact strength of the polyethylene sheet. The remainder of the above described composition was labelled "Composition C" and set aside for evaluation of slip-resistance of polyethylene film coated therewith.

The dried films or coatings of composition A through C inclusive, are characterized in having excellent slip-resistance as will be seen from the following.

*Example IV*

Duplicate sheets of 6.0 mil thick, transparent polyethylene films were coated separately with compositions A, B, or C, using the procedure described in Example I. Each separate sheet of polyethylene film had a dried coating of about 0.5 mil in thickness and was tested for slip-resistance as hereinafter described.

The following table shows the improvement in slip-resistance of the treated sheets of polyethylene film compared with an untreated control sheet.

|  | Uncoated Control | Composition Used | | |
| --- | --- | --- | --- | --- |
|  |  | A | B | C |
| Angle of Slip (degrees) | 17.7 | 33.1 | 35.1 | 35.0 |
| Percent Increase in Angle of Slip | 0 | 86.9 | 98.1 | 97.7 |

The angle of slip, which is a direct indication of slip-resistance is determined as follows:

An adjustable inclined plane having a fixed glass plate fastened thereto and equipped with an angle measuring scale is used as a testing device; a sheet of the polyethylene film, either the control or one of the treated sheets, is fastened in a suitable manner to the fixed glass plate; and a second sheet of polyethylene film, treated in the same manner, is mounted on a glass plate which is free to slide on the fixed glass plate. The sheet of polyethylene film and glass plate are mounted on the polyethylene covered fixed glass plate when the latter is in a horizontal position and then weighted with a 150 gram weight. The angle of the inclined plane is gradually and slowly increased until the movable weighted sheet of polyethylene film begins to slide or move down the inclined plane. The angle so determined is the angle of slip. In carrying out the above tests, the glass plates of the testing device were covered with the same treated or untreated polyethylene sheet.

The dried films or coatings of compositions A through C, inclusive, are smooth, continuous, clear and transparent. They are further characterized in being non-tacky and in having high-gloss and good slip-resistance.

The coatings formed by compositions A and B also have excellent flexibility and such coatings are excellent for use when it is desired to fold or bend the polyethylene sheets, since the coating will not break, crack, flake off, or otherwise lose its continuity on the treated polyethylene sheet.

When the surfaces of polyethylene sheets were coated with the hereinbefore described styrene-acrylic latices per se, the coatings were extremely tacky and adhered to untreated sheets when placed in contact with such sheets.

When the polyethylene sheets were coated with colloidal silica aquasols per se, the resultant coated sheets exhibited no slip-resistance. Since it is known that cellulosic sheets such as paper and boxboard may be rendered substantially slip-resistant when such coatings are applied, it is apparent that there is no adhesion of the colloidal silica per se to the polyethylene sheet, or to the other slipping thermoplastic polymer sheets referred to.

Example V

One hundred parts by weight of a stable homogeneous aqueous latex containing about 50% water and 50% of a finely divided dispersed copolymer consisting of the interpolymerization product of a mixture of 52% styrene, 40% 2-ethylhexyl acrylate, 2% methacrylic acid and 6% acrylonitrile and having an average particle size of between about 0.2 and 0.3 micron were added, with agitation at room temperature (about 25° C.), to 133 parts by weight of the colloidal silica aquasol described in Example I thereby forming a composition having a total solids content (comprised of the copolymer and $SiO_2$) of 38.6%, a viscosity of 7.5 centipoises at 25° C. and a specific gravity of 1.14 wherein the copolymer and $SiO_2$ were present in a weight ratio of 1.25:1.

The above composition was divided into three separate aliquots which were respectively diluted with water to provide compositions having respective total solids levels of 5%, 7.5% and 10% by weight respectively but having the same ratio of copolymer to $SiO_2$.

A 1.5 mil thick transparent sheet of polyethylene film was coated on one side with the composition containing 5% total solids, employing a laboratory coating machine to provide a liquid film which, when dried, consisted of a film having a thickness of about 0.5 mil of dried composition. The sheet was then heated at about 50° C. for about 5 minutes until it was dried, that is, free of liquid. A second 1.5 mil thick transparent sheet of polyethylene film was coated on one side with the composition containing 7.5% by weight of total solids as above described to produce a polyethylene film having a dried 0.6 mil thick coating. A third 1.5 mil thick transparent sheet of polyethylene was coated as above described with the composition containing 10% by weight of solids to produce a dried coating having a thickness of 0.7 mil. The coated sides of all three of the polyethylene sheets were characterized in having a high gloss and excellent slip-resistant properties. The quantitative slip-resistance measurements are shown in Example VI herein. The coatings were not tacky and did not reduce the transparency, tensile strength or the impact strength of the polyethylene film. The coated side of the polyethylene films also exhibited excellent soil-releasing and soil-retardency properties when compared with untreated polyethylene film.

Example VI

The coated transparent polyethylene sheets of Example V were evaluated for improvement in slip-resistance of "frictionization" by the method described in Example IV. The following table shows the improvement in slip-resistance of the treated sheets of polyethylene film compared with an untreated control sheet.

| Formulation | | Slide Angle, degrees | Percent Increase of Angle of Slip |
|---|---|---|---|
| Percent Total Solids | Latex/$SiO_2$ Ratio | | |
| Untreated Control | | 22.7 | 0 |
| 5.0 | 1.25:1 | 29.7 | 31 |
| 7.5 | 1.25:1 | 31.3 | 38 |
| 10.0 | 1.25:1 | 32.4 | 43 |

Example VII

The procedure of Example V was repeated using the compositions described in Example V except that the compositions were applied by means of a spray atomizer, to separate 3.5 mil thick transparent sheets of polyethylene film to provide polyethylene sheets having discontinuous films of respective coating compositions containing 5%, 7.5% and 10% by weight of solids wherein the weight ratio of copolymer to $SiO_2$ was 1.25:1.

The coated sides of the three polyethylene sheets were characterized in having high gloss and excellent slip-resistant properties. Additionally the coated sides exhibited excellent soil-resistant and soil-retardency properties when compared with an untreated polyethylene sheet of the same thickness. The coatings were not tacky and did not reduce the transparency, tensile strength or impact strength of the polyethylene film.

Slip-resistance measurements conducted as in Example VI demonstrated that these coated films had substantially the same improvement in slip-resistance over similar untreated polyethylene sheets as the treated polyethylene sheets of Example V (e.g. 1.5 mil thick) had over the untreated polyethylene sheets of that example.

Example VIII

Three separate compositions were prepared as follows:
An alkali-stabilized colloidal silica aquasol containing 30% by weight of $SiO_2$ having an $SiO_2$:$Na_2O$ weight ratio of about 90:1, a sodium sulfate content of about 0.1% by weight and containing particles of colloidal silica having an average particle size of about 40 millimicrons and particle sizes in the range of from about 35 to 50 millimicrons was added to an aqueous latex containing about 53% by weight of water and 47% by weight of a finely divided dispersed copolymer consisting of the interpolymerization product of a mixture of 52% styrene, 40% 2-ethylhexyl acrylate, 2% methacrylic acid and 6% acrylonitrile. The finely divided particles of the interpolymerization product had an average particle size of between 2000 and 3000 Angstroms. The silica aquasol and latex were mixed with agitation at room temperature (about 25° C.) in the proportions (parts by weight) listed below.

| Composition | 1 | 2 | 3 |
|---|---|---|---|
| Silica aquasol | 100 | 160 | 215 |
| Aqueous latex | 130 | 100 | 100 |

The coatings so produced had the following physical characteristics:

| Composition | Total Solids | Polymer–$SiO_2$ Ratio | Specific Gravity | Viscosity, 25° C. |
|---|---|---|---|---|
| 1 | 41.66 | 2:1 | 1.21 | 11.4 |
| 2 | 36.15 | 1:1 | 1.12 | 11.1 |
| 3 | 33.97 | 1:2 | 1.09 | 7.5 |

Three separate aliquot samples of composition 1 were diluted with water until they respectively contained 5%, 7.5% and 10% by weight of total solids but had a polymer-$SiO_2$ weight ratio of 2:1. The diluted samples were applied to separate polyethylene sheets having a thickness of 6.5 mils by means of an atomizer to form discontinuous coatings thereon. The polyethylene sheets were dried overnight in air at a temperature of 72° F. and a relative humidity of 50%.

All of the dried coated films were transparent and were characterized in having excellent slip-resistance and a high gloss finish. The films which had been coated with composition 1 containing 10% by weight of total solids exhibited a very slight tackiness and were not quite as soil resistant as the other coated films which exhibited fair to good soil-resistance. However, the films coated with the compositions containing 10% by weight total solids showed almost a 100% improvement in slip-resistance when compared with similar untreated polyethylene films. The coatings did not reduce the transparency, tensile strength or impact strength of the polyethylene films.

Three separate aliquot samples of composition 2, having a polymer-$SiO_2$ weight ratio of 1:1, were diluted with water until the samples respectively contained 5%, 7.5% and 10% by weight of total solids but had a polymer-$SiO_2$ weight ratio of 1:1. The diluted samples were applied to separate polyethylene sheets having a thickness of 3.5 mils by means of an atomizer to form a continuous coating thereon. The polyethylene sheets were dried overnight in air at a temperature of 72° F. and a relative humidity of 50%.

All of the dried coated films were transparent and were characterized in having excellent slip-resistance and a high gloss finish. All of the films were non-tacky and exhibited excellent soil-resistance and soil-retardency properties. In no instance did the coated films exhibit a reduction in transparency, tensile strength, or impact strength.

Three separate aliquot samples of composition 3, having a polymer-$SiO_2$ weight ratio of 1:2 were diluted with water until the samples respectively contained 5%, 7.5% and 10%, by weight of total solids but had a polymer-$SiO_2$ weight ratio of 1:2. The diluted samples were applied by means of a laboratory coating machine to separate polyethylene sheets having a thickness of 6.5 mils to form continuous liquid coatings thereon. The coatings varied in thickness after drying depending upon the total solids content of the respective composition, from 0.5 mil to 0.7 mil. The polyethylene films were dried overnight at a temperature of 72° F. and a relative humidity of 50%.

All of the dried coated films were transparent and were characterized in having excellent slip-resistance and a high gloss finish. All of the films were non-tacky and exhibited excellent soil-resistance and soil-retardency properties. In no instance did the coated films exhibit a reduction in transparency, tensile strength, or impact strength.

Three separate aliquot samples of composition 3, having a polymer-$SiO_2$ weight ratio of 1:2 were diluted with water until the samples respectively contained 5%, 7.5% and 10%, by weight of total solids but had a polymer-$SiO_2$ weight ratio of 1:2. The diluted samples were applied by means of a laboratory coating machine to separate polyethylene sheets having a thickness of 6.5 mils to form continuous liquid coatings thereon. The coatings varied in thickness after drying depending upon the total solids content of the respective composition, from 0.5 mil to 0.7 mil. The polyethylene films were dried over night at a temperature of 72° F. and a relative humidity of 50%.

All of the dried coated films were transparent and were characterized in having excellent slip-resistance and a good gloss finish. In no instance was there an adverse effect on the tensile strength or impact strength of the polyethylene films. All of the films were non-tacky and exhibited excellent soil resistance and soil retardency. However, the coatings of composition 3 having a polymer-$SiO_2$ ratio of 1:2, did not adhere to the polyethylene films quite as well as the coatings of composition 1, having a polymer-$SiO_2$ ratio of 1:1.

The adhesion of the coating to the polyethylene films was tested by means of the ability of a piece of Scotch tape, applied to the coating surface of the polyethylene film to remove the coating therefrom. Adhesion was evaluated as excellent when the Scotch tape substantially failed to remove the dried coating compositions from the polyethylene film.

Soil resistance and/or soil retardency was measured using the method described on page 156 of volume 27 of the Journal of the American Oil Chemists Society and consisted of blowing a synthetic soil on to the coated surfaces of the polyethylene films and observing the amount of soil retained on and adhering to such surfaces.

In general, coating compositions having a polymer-$SiO_2$ weight ratio of 1:1 produced coated films having the best and most nearly balanced combinations of slip-resistance, soil resistance and adhesive properties. Coating compositions having a polymer-$SiO_2$ weight ratio of 2:1 to 4:1 while having excellent slip-resistant properties are also soil-resistant compared to untreated films but are not quite as soil resistant as films coated with compositions having polymer-$SiO_2$ weight ratios of 1:1 and 1:2. On the other hand polyethylene films coated with compositions having a polymer-$SiO_2$ weight ratio of 1:2 to 1:4, while having excellent soil resistant properties and while having improved slip-resistance when compared with untreated polyethylene films are not as slip-resistant as films coated with compositions having a higher $SiO_2$ to polymer ratio.

It is to be understood that coating compositions containing up to 40% by weight of total solids may be used to form the coatings on the coated polyolefin films of this invention. However, uniform coatings are generally most readily obtained when the compositions contain from 5% to 10% by weight of total solids as compared to a total solids content in excess of 10% by weight.

What is claimed is:
1. A transparent article comprising (1) a thermoplastic polymer sheet having at least one normally slippery surface and (2) a slip resistant, smooth, non-tacky film on said surface and adherent thereto, which film is composed of a uniform mixture of particles of an alkali-stabilized, colloidal silica and particles of a finely divided copolymer comprising the interpolymerization product of;
 (a) from about 25 to 65% by weight of a monovinylidene aromatic hydrocarbon,
 (b) from about 60 to 34.5% by weight of an alkyl ester of an unsaturated acid selected from the group consisting of acrylic acid and methacrylic acid, and
 (c) from about 15 to 0.5% by weight of an ethylenically unsaturated carboxylic compound having at least one carboxyl group and copolymerizable with said monovinylidene aromatic hydrocarbon and said alkyl ester;

said praticles of colloidal silica and interpolymerization product being present in said film in a ratio of from 10 to 500 parts by weight of $SiO_2$ to 100 parts by weight of interpolymerization product.

2. The article of claim 1 in which the thermoplastic polymer sheet is a polyolefin sheet.

3. A transparent article comprising (1) a thermoplastic polymer sheet having at least one normally slippery surface and (2) a slip resistant, smooth, non-tacky film on said surface and adherent thereto, which film is composed of a uniform mixture of particles of an alkali-stabilized, colloidal silica and particles of a finely divided copolymer consisting essentially of the interpolymerization product of;
 (a) from about 25 to 60% by weight of a monovinylidene aromatic hydrocarbon,
 (b) from about 60 to 35% by weight of an alkyl ester of an unsaturated acid selected from the group consisting of acrylic acid and methacrylic acid,
 (c) from 5 to 20% by weight of an ethylenically unsaturated organic carboxylic compound having at least one carboxyl group and copolymerizable with said monovinylidene hydrocarbon and said alkyl-ester, and
 (d) from about 10 to 3% by weight of an unsaturated nitrile;

said particles of colloidal silica and interpolymerization product being present in said film in a ratio of from 10 to 500 parts by weight of $SiO_2$ to 100 parts by weight of interpolymerization product.

4. The article of claim 3 in which the thermoplastic polymer sheet is a polyolefin sheet.

5. A transparent article comprising (1) a solid polyolefin sheet having at least one normally slippery surface and (2) a slip resistant, smooth, non-tacky film on said surface and adherent thereto, which film is composed of a uniform mixture of particles of an alkali-stabilized, colloidal silica and particles of a finely divided interpolymer of;
 (a) from about 26 to 65% by weight of styrene,
 (b) from about 60 to 34.5% by weight of an alkylacrylate, and
 (c) from about 0.5 to 14% by weight of an ethylenically unsaturated organic carboxylic compound containing from 3 to 9 carbon atoms and having at least one carboxyl group and copolymerizable with said styrene and said alkyl acrylate;
said particles of colloidal silica and interpolymer being present in said film in a ratio of from 10 to 500 parts by weight of $SiO_2$ to 100 parts by weight of interpolymer.

6. An article as in claim 5 wherein the polyolefin sheet is polyethylene and the finely divided interpolymer is an interpolymer of from about 26% to 65% by weight of styrene, from about 60% to 34.5% by weight of an alkyl acrylate having from 4 to 8 carbons in the alkyl group and from about 0.5% to 14% by weight of an ethylenically unsaturated organic carboxylic compound containing from 3 to 9 carbon atoms and having at least one carboxyl group and copolymerizable with said styrene and said alkyl acrylate.

7. A transparent article comprising (1) a solid polyethylene sheet having at least one normally slippery surface and (2) a slip resistant, smooth, non-tacky film on said surface and adherent thereto, which film consists essentially of a uniform mixture of particles of an alkali stabilized, colloidal silica having an $SiO_2$ to $Na_2O$ weight ratio of from about 10:1 to about 500:1 and an average particle size of about 5 to about 80 millimicrons, and particles, having a particle size between about 100 to 400 Angstroms, of an interpolymer of;
 (a) from 26 to 65% by weight of styrene,
 (b) from 60 to 34.5% by weight of an alkyl acrylate having from 4 to 8 carbon atoms in the alkyl group, and
 (c) from 0.5 to 14% by weight of an alkyl half ester of maleic acid in which the alkyl group contains from 1 to 4 carbon atoms;
said particles of colloidal silica and interpolymer being present in said film in a ratio of from about 25 to 250 parts by weight of $SiO_2$ to 100 parts by weight of said interpolymer.

8. A transparent article, comprising (1) a transparent flexible polyethylene sheet having a thickness of at least 0.5 mil and having at least one normally slippery surface and (2) a slip resistant, smooth, non-tacky film on said surface and adherent thereto, which film is composed of a uniform mixture of particles of an alkali stabilized colloidal silica having a $SiO_2$ to $Na_2O$ weight ratio of from about 10:1 to about 500:1 and an average particle size of about 5 to about 80 millimicrons, and particles of a finely divided interpolymer of:
 (a) form 30% to 48% by weight of styrene,
 (b) from 69.5% to 38% by weight of octyl acrylate, and
 (c) from 0.5% to 14% by weight of an ethylenically unsaturated organic carboxylic compound containing from 3 to 9 carbon atoms and having at least 1 carboxylic group and copolymerizable with said styrene and said octyl acrylate,
the particles of said interpolymer having a particle size between about 150 and 250 Angstroms; the quantity of colloidal silica in said film being in the range of from about 25 to 250 parts by weight of $SiO_2$ per 100 parts by weight of said interpolymer.

9. A transparent article comprising (1) a solid polyolefin sheet and having at least one normally slippery surface and (2) a slip resistant, smooth, non-tacky film on said surface and adherent thereto, which film is composed of a uniform mixture of particles of an alkali-stabilized, colloidal silica having an $SiO_2$ to $Na_2O$ weight ratio of from about 10:1 to 500:1 and particles of a finely divided interpolymer of;
 (a) from about 25 to 60% by weight of styrene;
 (b) from about 60 to 35% by weight of an alkyl ester of arcylic acid containing from 5 to 20 carbon atoms in the alkyl group,
 (c) from about 5 to 2% by weight of a copolymerizable ethylenically unsaturated carboxylic compound containing from 3 to 9 carbon atoms and having at least one carboxylic group, and
 (d) from about 10 to 3% by weight of an unsaturated nitrile selected from the group consisting of vinyl nitrile and vinylidene nitrile;
said particles of colloidal silica and interpolymer being present in said film in a ratio of from about 10 to 500 parts by weight of $SiO_2$ to 100 parts by weight of said interpolymer.

10. An article as in claim 9 wherein the polyolefin sheet is a polyethylene sheet and the finely divided interpolymer is an interpolymer of from about 25% to 60% by weight of styrene, from about 60% to 35% by weight of an alkyl ester of acrylic acid containing from 5 to 20 carbon atoms in the alkyl group, from about 5% to 2% by weight of methacrylic acid and from about 10% to about 3% by weight of acrylonitrile.

11. An article as in claim 9 wherein the polyolefin sheet is a polyethylene sheet and the finely divided interpolymer is an interpolymer of from about 25% to 60% by weight of styrene, from about 60% to 35% by weight of octyl acrylate, from about 5% to 2% by weight of methacrylic acid and from about 10% to about 3% by weight of acrylonitrile.

12. A transparent article comprising (1) a solid polyethylene sheet and having at least one normally slippery surface and (2) a slip resistant, smooth, non-tacky film on said surface and adherent thereto, which film consists essentially of a uniform mixture of particles of an alkali-stabilized colloidal silica having an $SiO_2$ to $Na_2O$ ratio of from about 80:1 to about 300:1 and an average particle size of about 5 to 80 millimicrons, and particles, having a particle size between 1000 and 5000 Angstroms, of an interpolymer of;
 (a) from about 25 to 60% by weight of styrene,
 (b) from about 60 to 35% by weight of an alkyl ester of acrylic acid containing from 5 to 20 carbon atoms in the alkyl group,
 (c) from about 5 to about 2% by weight of a copolymerizable ethylenically unsaturated carboxylic compound containing from 3 to 9 carbon atoms and one carboxylic group, and
 (d) from about 10 to 2% by weight of an unsaturated nitrile selected from the group consisting of vinyl nitrile and vinylidene nitrile;
said particles of colloidal silica and interpolymer being present in said film in a ratio of about 25 to 250 parts by weight of $SiO_2$ to 100 parts by weight of said interpolymer.

13. A transparent article comprising (1) a solid, transparent, flexible polyethylene sheet having a thickness of at least 0.5 mil and at least one normally slippery surface and (2) a slip resistant, smooth, non-tacky film on said surface and adherent thereto, which film consists essentially of a uniform mixture of particles of an alkali-stabilized colloidal silica having an $SiO_2$ to $Na_2O$ ratio of from about 80:1 to about 300:1 and an average particle size of about 10 to 25 millimicrons, and particles, having a particle size between 1000 and 5000 Angstroms, of an interpolymer of;
  (a) from about 40 to 60% by weight of styrene;
  (b) from about 45 to 35% by weight of 2-ethylhexyl acrylate,
  (c) from about 5 to 2% by weight of methacrylic acid, and
  (d) from about 10 to 3% of acrylonitrile;
said particles of colloidal silica and interpolymer being present in said film in a weight ratio of between about 1:3 to about 3:1.

References Cited by the Examiner
UNITED STATES PATENTS

| | | | |
|---|---|---|---|
| 2,643,048 | 6/1953 | Wilson | 229—53 |
| 2,653,113 | 9/1953 | Banigan | 117—138.8 |
| 2,676,121 | 4/1954 | Chapman | 117—138.8 |
| 2,701,218 | 2/1955 | Nickerson | 117—128.8 |
| 2,909,443 | 10/1959 | Wolinski | 117—16 |
| 2,917,223 | 12/1959 | Bolt et al. | 229—53 |
| 2,959,497 | 11/1960 | Williams | 117—161 XR |
| 3,028,259 | 4/1962 | Webber | 117—161 XR |

WILLIAM D. MARTIN, *Primary Examiner.*
RICHARD D. NEVIUS, E. J. DRUMMOND,
*Examiners.*